Dec. 8, 1931.  A. G. F. KUROWSKI  1,835,165
COMBINED TYPEWRITING AND COMPUTING MACHINE
Filed Dec. 11, 1925  7 Sheets-Sheet 1

Inventor:
Alfred G. F. Kurowski
by O. C. Stickney
Attorney

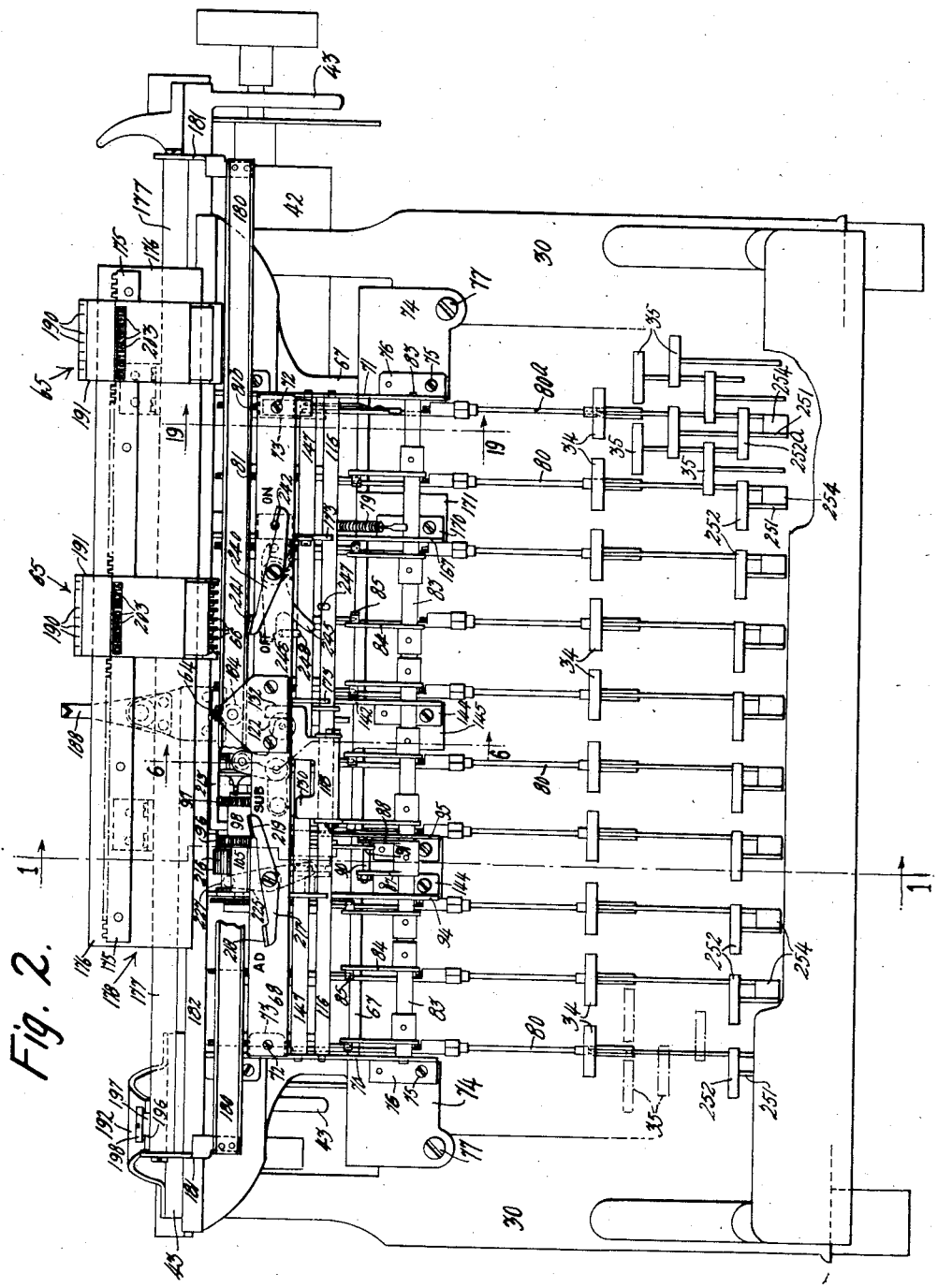

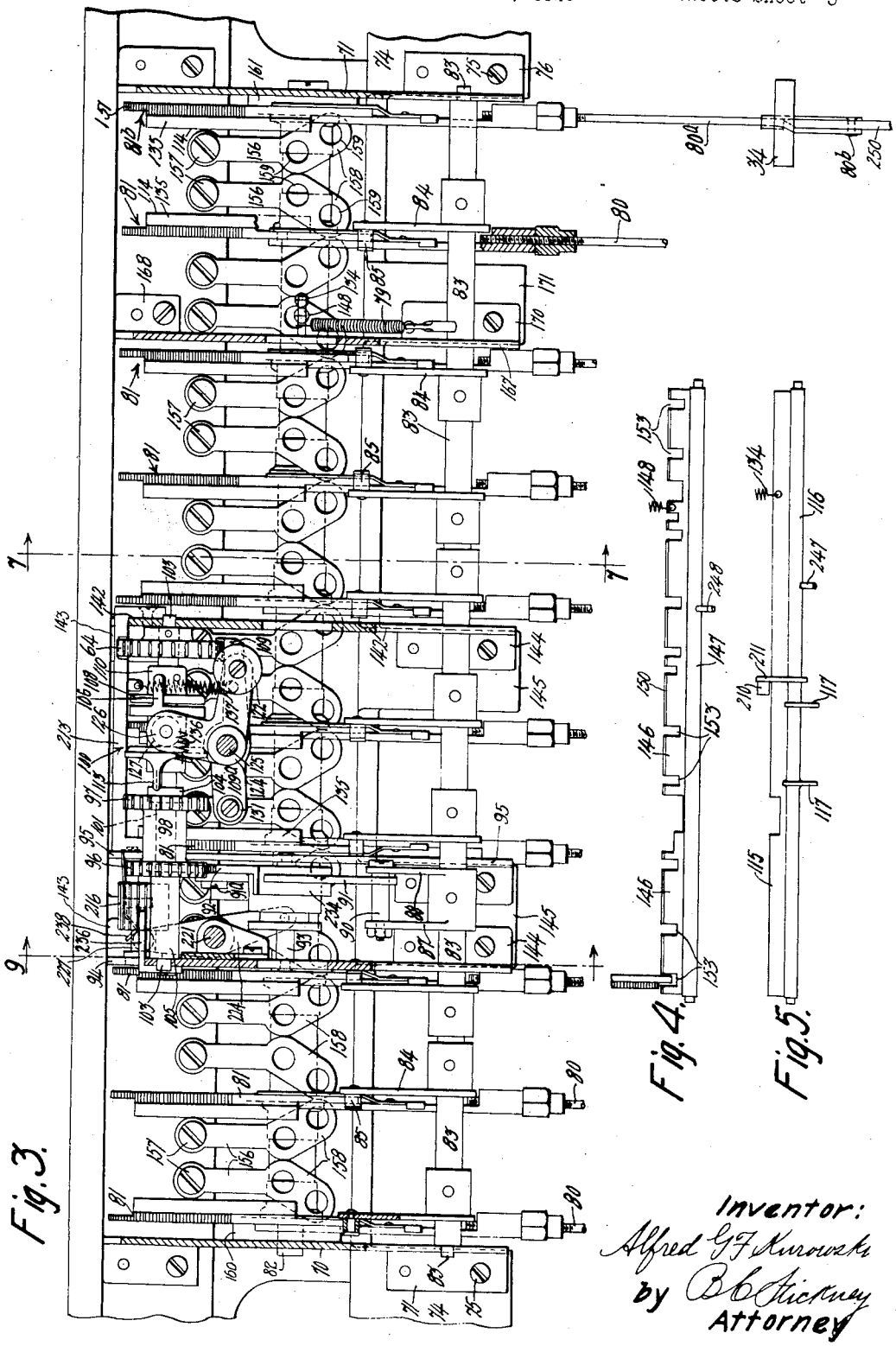

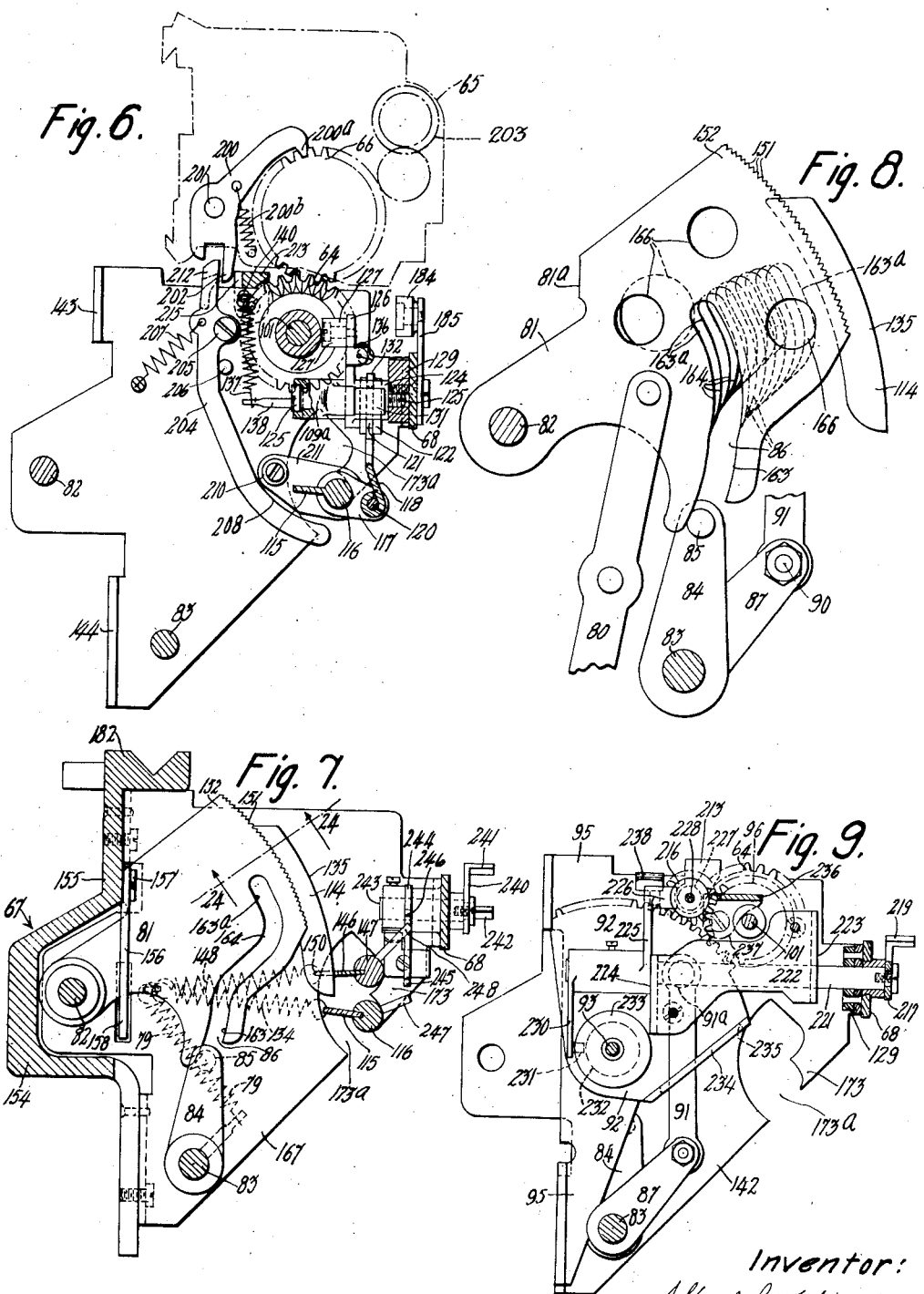

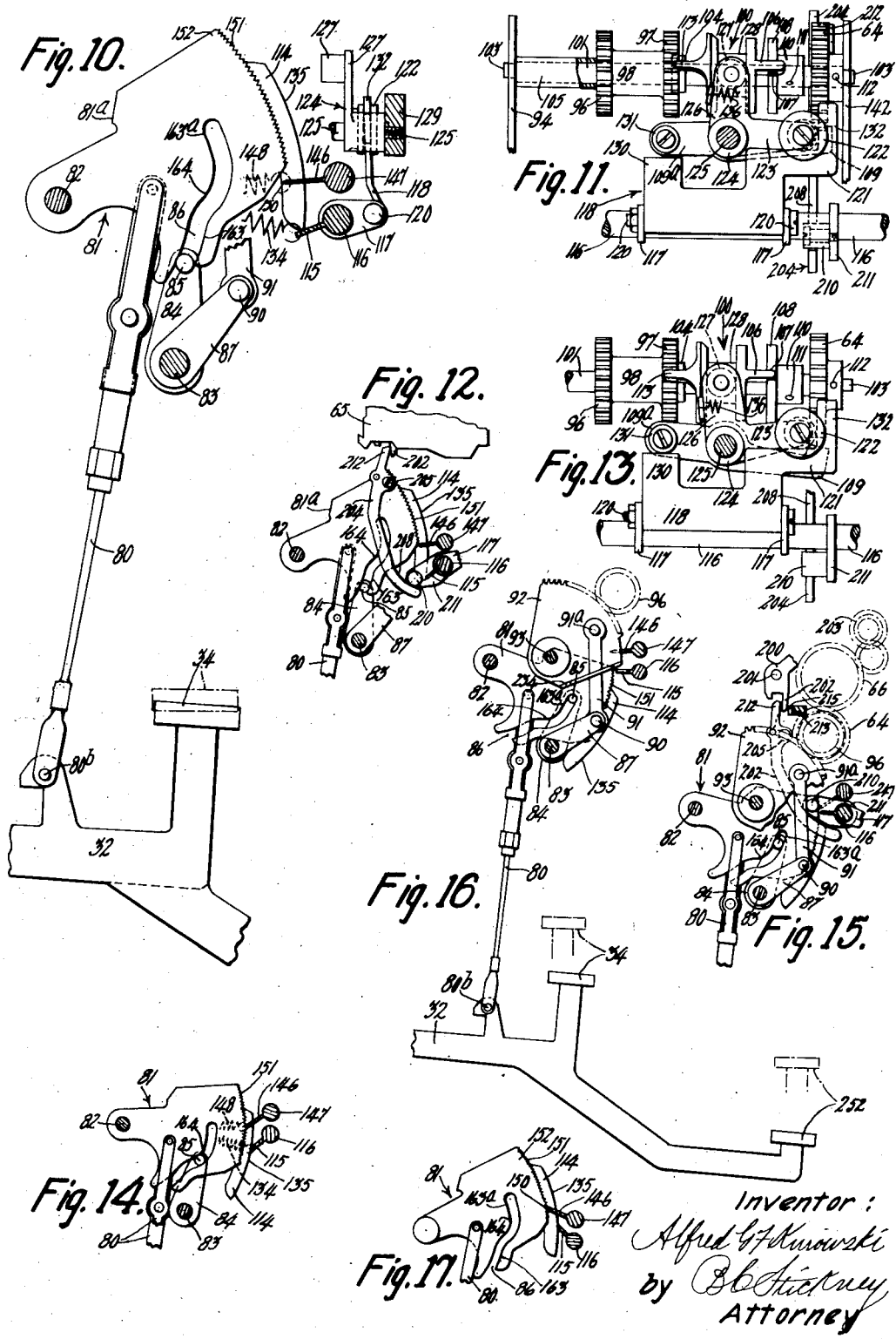

Dec. 8, 1931.  A. G. F. KUROWSKI  1,835,165
COMBINED TYPEWRITING AND COMPUTING MACHINE
Filed Dec. 11, 1925  7 Sheets-Sheet 6

Inventor:
Alfred G. F. Kurowski
by B. C. Stickney
Attorney

Dec. 8, 1931.  A. G. F. KUROWSKI  1,835,165
COMBINED TYPEWRITING AND COMPUTING MACHINE
Filed Dec. 11, 1925   7 Sheets-Sheet 7
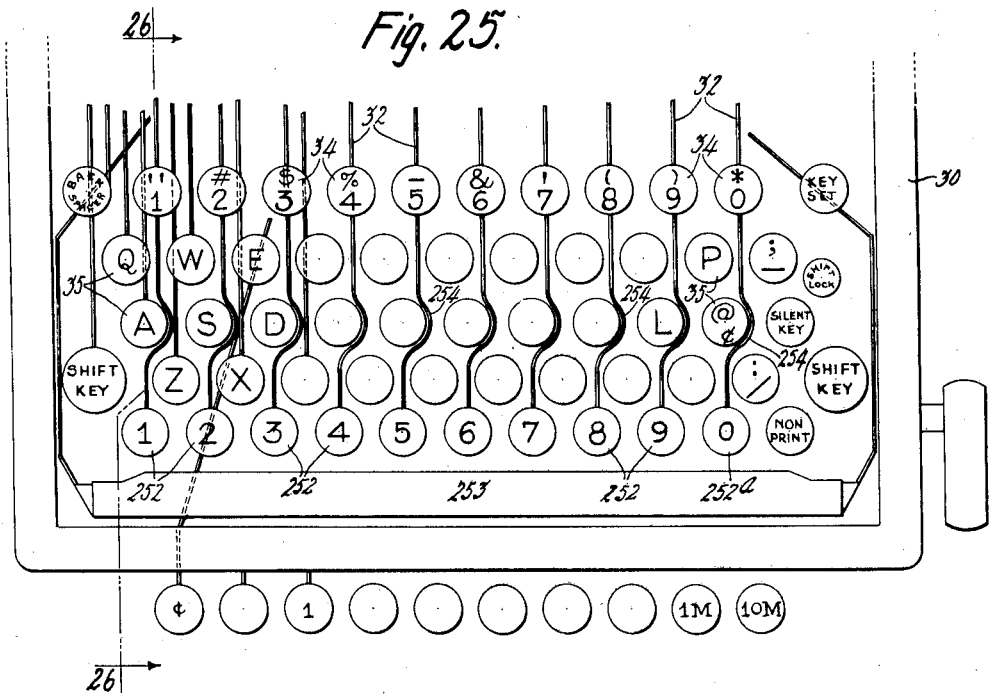
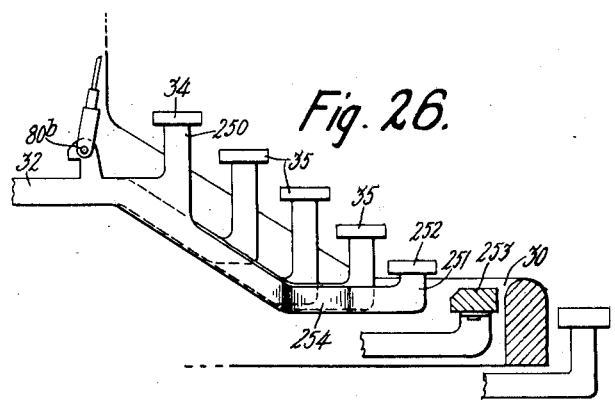
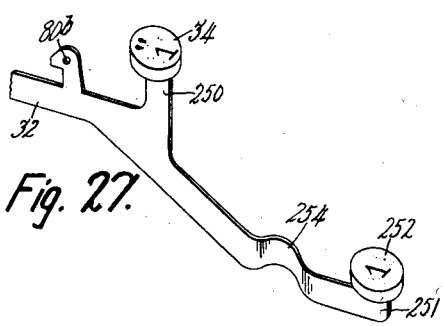

Patented Dec. 8, 1931

1,835,165

UNITED STATES PATENT OFFICE

ALFRED G. F. KUROWSKI, OF BROOKLYN, NEW YORK, ASSIGNOR, BY MESNE ASSIGNMENTS, TO ELLIOTT-FISHER COMPANY, OF NEW YORK, N. Y., A CORPORATION OF DELAWARE

COMBINED TYPEWRITING AND COMPUTING MACHINE

Application filed December 11, 1925. Serial No. 74,698.

This invention relates to combined typewriting and computing machines, and especially to the master-wheel type in which one or more totalizers are supported on a totalizer-truck, to travel with the typewriter-carriage, and in which each totalizer includes a series of computing wheels which are brought into effective relation with a relatively fixed master-wheel as the carriage passes, step by step, through the computing zone, and in which the master-wheel is supported in an actuator-frame mounted at the front of the main frame of the machine, the actuator including numeral-key-operated camming devices to rotate the master-wheel through variable angular distances, according to the value of the numeral-key operated.

An object of the present invention is to produce a machine of the above-mentioned type at a minimum of cost of production. To this end, the machine includes a reduced number of parts, most of which may be stamped and formed from sheet-metal without the costly machining operations as heretofore.

In arranging a type-action the leverage transmitted from the keyboard, to actuate the type-bars and their operative parts, is relatively proportioned to maintain a uniform "dip" and a uniform "touch" for the keys on all four banks. When a computing mechanism is adjusted to these typewriter conditions after the manner of the well-known Wahl mechanism, the truck and totalizers are carried at the front of the carriage and the computing actuator-mechanism positioned below the truck and over the upper bank or numeral row of keys. When connection is made from these numeral-key-levers to the actuating devices of the computing actuator, the point of connection to each lever is adjacent their key-caps, and these numeral-keys, that were mechanically conditioned to type a numeral at a normal stroke of a key, are given an added burden of actuating a train of computing devices simultaneously to the projection of its type-bar to print. This added burden transferred to the numeral-key places the adding manipulations of the keys in a class by themselves where the usual staccato type-printing blow cannot be employed, because each key requires a full down-stroke of the finger to complete a computing cycle at, or before, the printing of the types. The computing operation derives little benefit from the leverage of the key-levers, because the connection to the actuator is so very close to the key-cap.

Another feature of the invention provides for the extension of each numeral-key-lever forwardly and downwardly to the position of a second row of numeral-keys just in front of the lower bank of alphabet-keys and at the rear of the space bar. By providing each numeral-lever with two key-stems and two keys, one key at the usual numeral or upper bank position to be manipulated when numerals are to be typed and not computed, and the other key advanced forwardly of the keyboard to increase the leverage and power transmitted from the impact of the finger to the computer-actuator when numerals are to be typed and simultaneously computed, incidentally reduces the force of finger-impact to approximately one-third of that required heretofore at the upper bank of keys to actuate the same totalizing cycle of movement, and restores the manipulation of the combined typing and computing keyboard, as a whole, to a uniform "touch" of operation.

Other features relate to the simplicity of construction of the actuator-frame, which includes a rear bar and a front bar connected to each other by sheet-metal end plates; intermediate sheet-metal plates provided to serve as brackets to assist in supporting a differential shaft and the shaft upon which the actuating cams are supported; to prevent springing of said shafts, and maintain close fitting mesh between the rack and the master-wheel to eliminate back-lash; to keep the weight of the machine at a minimum by cutting away the lower central section of the back bar of the actuator-frame; to provide the back bar with a channel to condense the assembly of the differential shaft and the actuating cams; to provide locking devices that co-operate with the actuating cams, and permit only one to be operated at a time; to provide means for guiding the totalizer-truck, so as to insure proper engagement of the master-wheel and the computing wheels of the totalizer; and to provide a totalizer-truck including a front bar and a rear bar, the rear bar running upon the rail secured to the top of the back bar of the actuator-frame, the front bar of the truck being channel-shaped and running on a roller, so that said truck at the front is guided only at a single point, said guide-roller being disposed directly in front of the master-wheel.

Other features and advantages will hereinafter appear.

In the accompanying drawings,

Figure 2 is a front elevation of the machine with certain of the typewriting parts omitted for clearness.

Figure 3 is a front elevation on an enlarged scale of the actuator-mechanism shown in Figure 2, with the front cross-bar removed.

Figure 4 is a top plan view of the two-way full-stroke pawl mounted longitudinally of its rock-shaft.

Figure 5 is a top plan view of the rock-shaft, which is vibrated by the key-actuated cam-devices, to initially shift the master-wheel into operative engagement with the differentially-driven gear-sector.

Figure 6 is a sectional side view of the actuator taken on the line 6—6 of Figure 2, looking in the direction of the arrows.

Figure 7 is a similar view taken on the line 7—7 of Figure 3.

Figure 8 is an enlarged detail side view, showing the series of key-actuated camming devices, that differentially rock the shaft, carrying the master-wheel driving gear-sector.

Figure 9 is a view similar to Figure 6 taken on the line 9—9 of Figure 3.

Figure 10 is an enlarged fragmentary side view, showing a numeral-key partially depressed to actuate the master-wheel-clutch sufficiently to cause the tooth of the slidable clutch-element to engage the pinion, to connect the master-wheel with the actuating mechanism during the early part of the depression of the numeral-key, and prior to the unlocking of the master-wheel.

Figure 11 is a fragmentary front view, showing the master-wheel lock and the master-wheel clutch, the parts being in position when the key-lever is operated to the extent shown in Figure 10.

Figure 12 is a view similar to Figure 10, but shows the key-actuated camming element shifted sufficiently to completely connect the master-wheel, the dial-wheel locking lever being also operated to release the dial-wheel by means of a release lever, said locking lever having entered a slot in a fixed bar to lock the carriage against letter-feeding movement while the number is being run into the register by the rotation of the master-wheel.

Figure 13 is a front view similar to Figure 11, showing the master-wheel unlocked and connected to the driving mechanism, the parts being in the position corresponding to those in Figure 12.

Figure 14 is a view similar to Figure 12, but shows the next step in the depression of the key, namely, that of actuating the differential shaft, the full-stroke device being shown effective to prevent a premature return of the numeral-key.

Figure 15 is a view similar to Figure 12, but shows the key actuated to a sufficient extent to complete the computation, the dial-wheel locking lever having again resumed its normal position.

Figure 16 is a view similar to Figure 15, but shows the key-lever fully depressed, so as to free the full-stroke device to enable the numeral-key and its connected actuating cam to return to normal position.

Figure 17 is a view similar to Figure 16, but shows the actuating cam returning to its normal position, the full-stroke device being effective to prevent a premature depression of the key.

Figure 18:
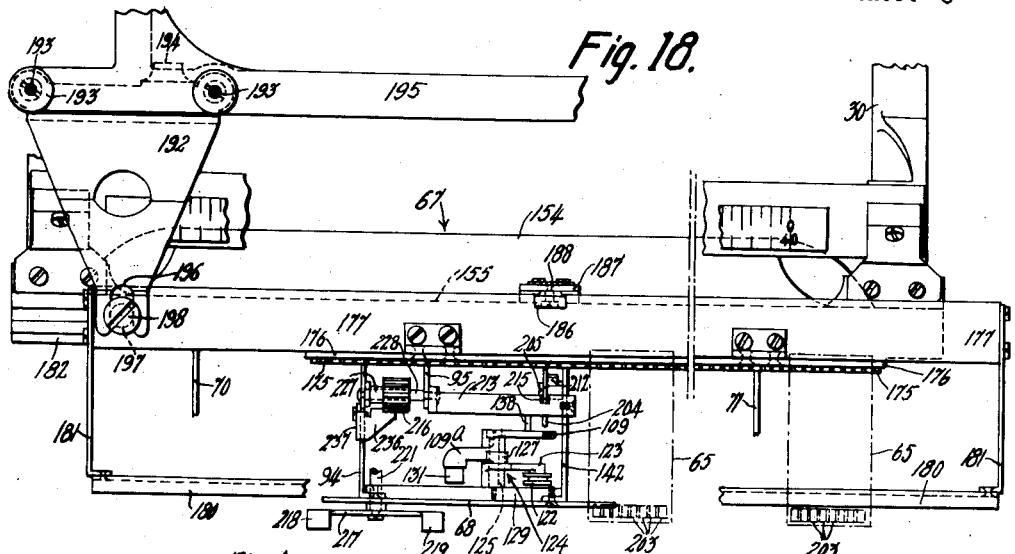

Figure 18 is a top plan view, showing a portion of the typewriter-carriage, and the manner of connecting the totalizer-truck to the carriage and some of the actuator parts.

Figures 19, 20, 21:
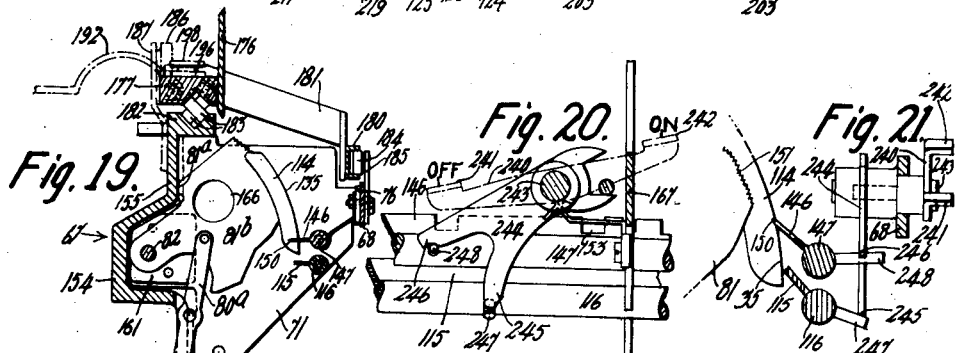

Figure 19 is a sectional side view of the actuator taken on the line 19—19 of Figure 2, and shows the construction of the totalizer-truck and the actuator-cam connected to the "0" key.

Figure 20 is an enlarged fragmentary front view of the means for disconnecting the computing mechanism, so that the numeral-keys may be operated to type the numbers without computing them, said mechanism being set in its disconnect or "off" position.

Figure 21 is a detail view of the parts shown in Figure 20, as seen from the left-hand side.

Figures 22, 23, 24:
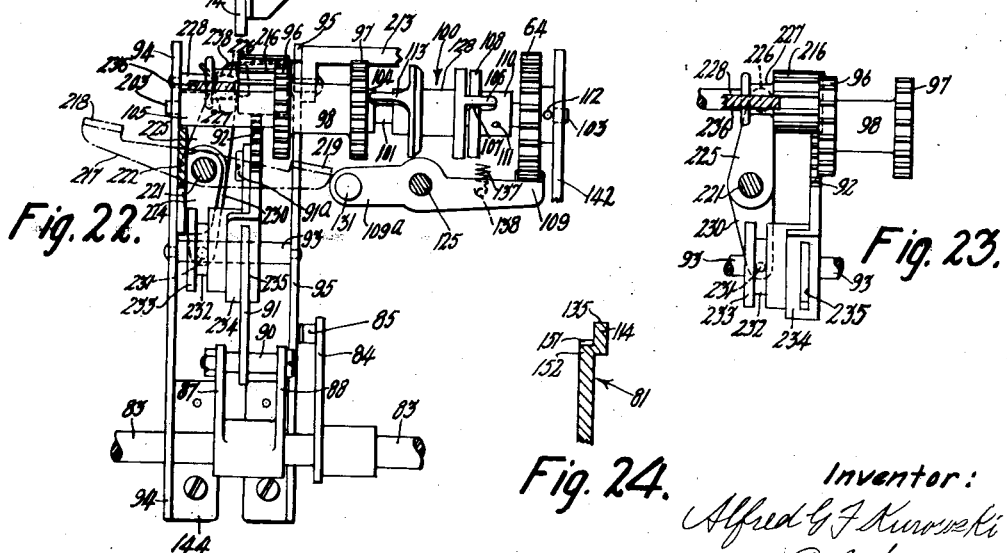

Figure 22 is a fragmentary front view of the state-setting mechanism, showing the parts set for subtraction.

Figure 23 is a fragmentary front view of a portion of the state-setting mechanism about to shift from the subtractive state of Figure 22 to an additive state.

Figure 24 is a detail sectional view, showing the construction of a portion of an actuating cam, the section being taken on the line 24—24 of Figure 7.

Figure 25 is a plan view of the keyboard, showing an upper bank of numeral-keys and a forward lower bank of numeral-keys.

Figure 26 is a side elevation, in section, through the keyboard of Figure 25, on a plane indicated by the line 26—26 of Figure 25.

Figure 27 shows a key-lever in perspective, having two key-stems and two key-caps.

The invention is shown applied to an Underwood typewriting machine, which includes a main frame 30 having a fulcrum-rod 31, about which key-levers 32, including numeral-keys 34 and alphabet-keys 35, may vibrate to swing bell-cranks 36 about a common fulcrum 37 to swing radially-arranged type-bars 38 upwardly and rearwardly about a common fulcrum-rod 40, to cause types 41 to print against the front face of a platen 42. The platen 42 is supported in a carriage 43 to travel back and forth in the usual manner upon a front rail 44 and a rear rail 45, and is urged leftwardly in a letter-space direction by a spring-drum 46 connected to said carriage by a strap 47. The carriage is normally held against the tension of the spring-drum by one of two escapement-dogs 48 and 49 mounted upon a dog-rocker 51 pivoted at 52. The dog 48 normally engages with the teeth of an escapement-wheel 53 having the usual one-way connection with a pinion 54 meshing with a rack 55 supported on the typewriter-carriage 43. To actuate the dog-rocker a curved universal bar 56 is vibrated by heels 57 of the type-bars as they swing upwardly and rearwardly against the platen. The universal bar 56 is carried by a frame 58 extending rearwardly and pivotally supported at its rear end at 60 upon two arms 61 of a rocking frame pivoted at 62 to the main frame. The frame 58 is provided with a cross-bar 58ª to engage the dog-rocker 51, so as to disengage the dog 48 and shift the dog 49 into engagement with the escapement-wheel. Upon the return stroke of the type-bars, the universal bar 56 and dog-rocker 51 are returned by means of springs (not shown).

The computing mechanism includes a relatively fixed actuator 63 having a master-wheel or gear 64 arranged to actuate one or more computing heads or totalizers 65 connected to travel with the typewriter-carriage in a manner hereinafter described. Each totalizer includes a series of denominationally arranged computing wheels 66 which are brought seriatim into co-operative relation with the master-wheel as the totalizer traverses the computing zone.

The actuator 63 includes a framework comprising a back bar 67, a front bar 68 (Figures 2, 6 and 7) and end plates 70 and 71, the bar 68 being secured to the end plates by screws 72 threaded into ears 73 of said end plates. Said end plates are secured to downward extensions 74 on the back bar 67 by screws 75 passing through ears 76 on said end plates and threaded into the downward extensions 74. The actuator includes mechanism, hereinafter described, for actuating the master-wheel 64, and may be attached as a unit to the usual Underwood typewriting machine by screws 77, which screws may replace the ones which usually hold the front coverplate, not shown, on the machine.

Figure 1:
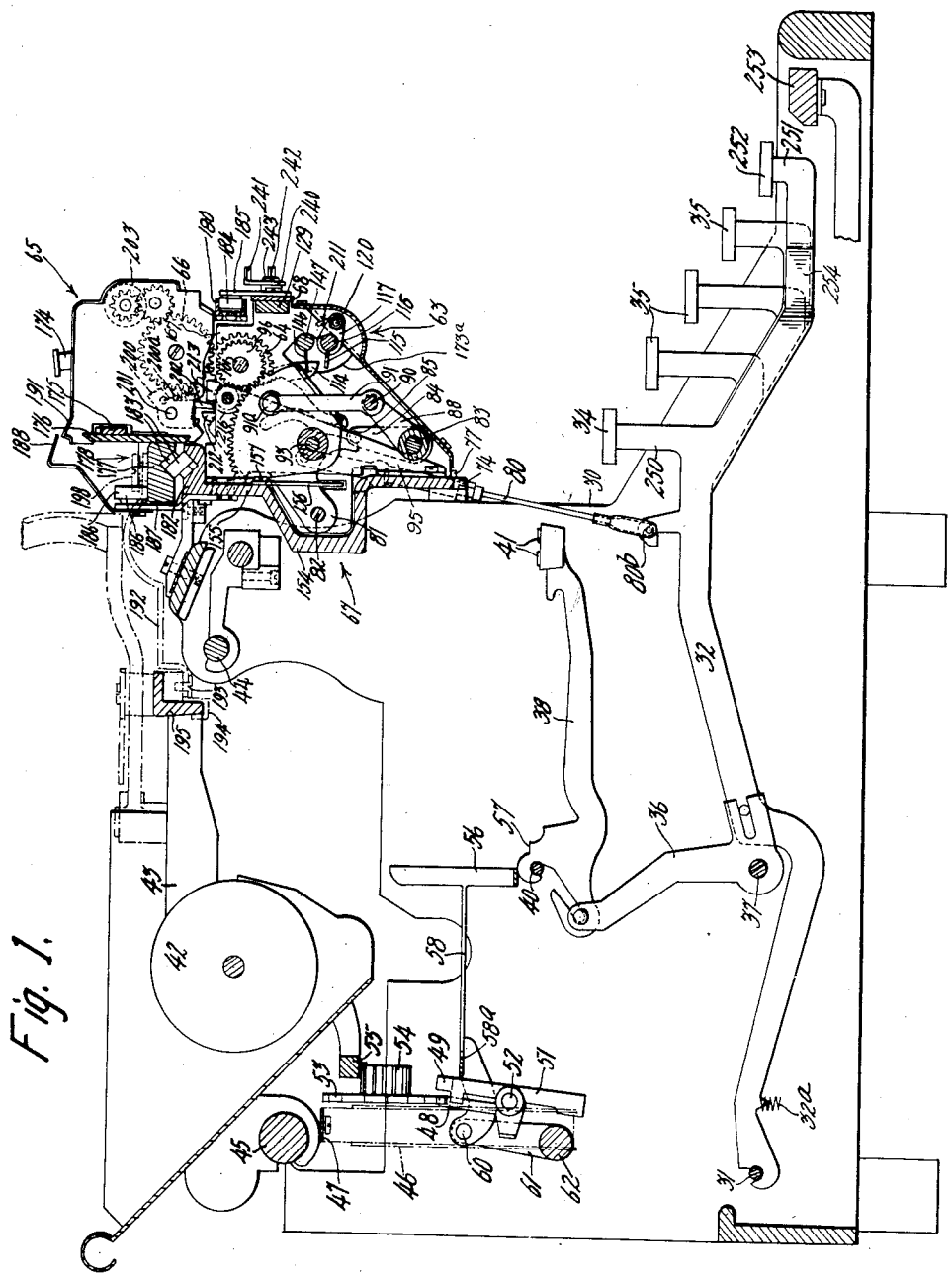
Figure 1 is a sectional side elevation of the machine taken on the line 1—1 of Figure 2, with only such parts of the typewriting mechanism disclosed as may be required to illustrate the present invention.

The master-wheel 64 is connected to be operated by the numeral-keys through distances varying according to the value of the keys. To this end, each numeral-key lever 32 is connected by a link 80 to an actuating cam-device 81 (Figures 1 and 2) pivotally supported as a series upon a shaft 82 supported by the end plates 70 and 71 of the actuator. Each cam-device 81 has a stop face 81ª to bear against the face of the rear bar 67. Upon the depression of a numeral-key the associated actuating cam-device 81 is swung downwardly about its fulcrum to actuate a rock-shaft 83 through the medium of an arm 84 fixed on said shaft 83, and held in operative engagement with its cam by a spring 79 acting upon said shaft, as shown at Figure 7, and said arm 84 has a pin 85 engaging with a cam-slot 86. The rock-shaft 83 is provided with a series of these arms 84, one arm being associated with each cam-device 81, and the cam-slots 86 therein varying in shape, as indicated in Figure 8, to rock the shaft 83 differentially through various angular distances varying in extent according to the value of the numeral-key. The differential movements of the rock-shaft 83 are transferred to the master-wheel 64 through a train of connections including arms 87 and 88 secured to said shaft, said arms 87 and 88 being tied together at their free ends by a stud-shaft 90, arranged to pivotally carry a link 91 pivotally connected at 91ª with a segmental rack or gear-sector 92 mounted to swing upon a stud-shaft 93 secured between brackets or plates 94 and 95 (Figure 3) fixed to the back bar 67. Said rack 92 engages, when the machine is set for addition, with a master pinion 96 to rotate the latter, and is connected to a tooth clutch-member 97 through the medium of a sleeve 98 to rotate therewith. The master-wheel 64 is normally disconnected from the master pinion 96, but, during the initial depression of any numeral-key, said pinion 96 becomes effective to drive the master gear in a manner hereinafter described, through the medium of a clutch-element 100. The pinion 96, the toothed member 97 and the sleeve 98, are revolubly supported on a shaft 101, Figure 11, having end bearings in intermediate plates 94 and 142 by means of reduced pivot ends 103. Said master pinion-element is held in position lengthwise of said shaft 101 by means of a collar 104 at one side and a sleeve 105 at the other side thereof. The clutch-element 100 is provided at its right-hand side with a tongue 106, Figure 13, engaging within a slot 107 of a driving disk 108 provided with a hub 110 that may be secured to the shaft 101 by a pin 111. The master-wheel 64 is also secured to said shaft by means of a pin 112. When the clutch-member 97 is rotated, the clutch-element 100 having previously been connected therewith, through the medium of a tooth 113 engaging between the teeth of said member, the master-wheel 64 is also rotated through the same angular distance, and which angular distance varies according to the numeral-key operated.

The master-wheel 64 is normally locked by a pawl 109, Figures 11 and 13, engaging between the teeth of the master-wheel, so as to prevent accidental displacement thereof and thus assure alignment of its teeth with those of the computing-wheels 66. The master-wheel is unlocked during the early part of the depression of a numeral key, but before this takes place the clutch-element 100 is shifted laterally from the position in Figure 3 to the position in Figure 11, to cause the tooth 113 to engage between two adjoining teeth of the toothed member 97. It will be seen that the tooth 113 has partly entered between the teeth of said member 97 in Figure 11 to make a driving connection therewith.

This sliding movement of the clutch-element 100 is brought about by any one of the numeral-keys through the medium of an offset extension 114 on each actuating cam 81, that engages a universal plate or blade 115 on a shaft 116 to rock the latter in a counter-clockwise direction, Figure 10. This shaft 116 is provided with two arms 117 secured thereto, between which a thrust-plate or lifter 118 is pivotally mounted by means of a bolt 120. The thrust-plate 118 is provided with an extension or shoe 121 engaging within an annular groove in a roller 122 pivotally secured to the front face of an arm 123 of a bell-crank 124 that is pivotally mounted upon a stud 125, Figures 6, 11 and 13, threaded into a block 129 secured to the front bar 68 of the actuator-frame. The other arm 126 of the bell-crank 124 is provided at its upper end with a roller 127 engaging in an annular groove 128 formed in the clutch-element 100. Thus when the shaft 116 is rocked in the counter-clockwise direction in Figure 10, the clutch-element 100 is moved leftwardly to the position of Figure 13 to connect it with the toothed member 97. After the clutch-element 100 has been partially connected with the member 97, as shown in Figure 11, the master-wheel may be unlocked by withdrawing the pawl 109 from said master-wheel. To bring this about, the thrust-plate 118 is provided with another extension 130 to engage a roller 131 mounted upon an arm 109ª integral with the pawl 109 pivotally supported on the stud 125 to be rocked by the extension 130 and withdraw the pawl 109 from its locking engagement with the teeth of the master-wheel 64.

It will be remembered that the thrust-plate 118 is pivotally supported on the bolt 120, and it is desirable to keep said plate in its upright position, so that it may always be in a position to engage with the roller 122 and the roller 131. For this purpose the thrust-plate is provided with a long finger 132 engaging within the annular groove in the roller 122 to guide said plate in its up-and-down movements.

While an actuating cam 81 is being operated by the depression of its key 34, the connection of the master-wheel with the driving mechanism is retained by means of a dwell 135 on the extension 114, which holds the shaft 116 in its operated position at Figure 12. After the number has been run into the register the blade 115 leaves the dwell 135 at its upper end, Figure 15, thus enabling a spring 134 to restore the rock-shaft 116, and consequently the thrust-plate 118, to normal position. A spring 136 connected to the arm 126 of the bell-crank 124, Figure 11, may then restore the bell-crank to its normal position with the roller 122 bearing upon the extension 121, thus drawing the clutch-member rightwardly in Figure 13, to withdraw the tooth 113 from the teeth of the member 97, and consequently disconnect the master-wheel 64 from the driving mechanism. This disconnection is made to enable the numeral-key and the connected actuating mechanism to rotate back to normal position without rotating the master-wheel, the master-wheel remaining always in the position to which it is rotated during the downward movement of the numeral-key. Upon the return of the thrust-plate 118 to normal position, the roller 131 upon the arm 109ª of the pawl 109 will follow the restoring movement of said plate and raise the pawl into locking engagement with the teeth of the master-wheel 64, and accurately align the teeth of the master-wheel for a side entrance through the computing wheels 66, the pawl 109 being restored to its normal locking position by means of a spring 137, Figure 6, connected to a pin 138 extending rearwardly from said pawl 109, and also connected to a fixed pin 140.

Upon the return stroke of the numeral-key, the carriage may be fed to the next letter-space position by the previously-described escapement-mechanism, to bring the next adjacent computing wheel of the totalizer into meshing relation with the master-wheel. To assist the side entrance of the teeth of the computing wheels 66 into proper meshing relation with the master-wheel while the totalizer is being moved back or forth, the teeth of the master-wheel are pointed at their side faces, in a well-known manner, as indicated in Figures 3 and 6. Similarly the teeth of the member 97 are pointed, so as to enable the tooth 113 of the clutch-element 100 to enter readily between said teeth.

Upon the return stroke of the numeral-key from the position in Figure 16, the upper end of the extension 114 engages the blade 115 of the rock-shaft 116, to actuate said rock-shaft idly in a clockwise direction, so as to allow the extension to brush by said blade 115. During the final part of the return stroke of said key, the blade leaves the extension 114 and resumes its normal central position indicated in Figure 7, where it is held by the spring 134.

To prevent springing of the shaft 82, upon which the actuating cams 81 are supported, and also to prevent springing of the differential shaft 83, both shafts, in addition to being supported by the end plates 70 and 71, are reinforced by the intermediate plates or brackets 94 and 142, Figures 2 and 3, secured at their upper ends by ears 143 (Figure 6) to the back bar 67 of the actuator-frame, and at their lower ends said plates are secured by ears 144 to downward extensions 145 on said bar 67. A third intermediate plate 167, Figure 3, is provided to further assist in preventing the springing of the shafts 82 and 83, said plate being secured to the back bar 67 by means of an ear 168 at its upper end, and at its lower end by means of an ear 170 secured to another downward extension 171 on said bar 67. All of the intermediate brace plates as 95, 142 and 167 are provided with clearance cutouts 173ª, Figures 7 and 9, for the blade 115 and a blade 146 carried, respectively, on the rock-shafts 116 and 147. To brace said rock-shafts at the front, so as to prevent springing of said rock-shafts outwardly when operated, said intermediate plates are provided with portions 173 to abut said rock-shafts at their front faces. It will be noted that the back bar 67 is provided with cutouts to form the downward extensions 74 and 145, thus assisting in keeping the weight of the machine at a minimum.

Full-stroke mechanism is provided to compel a full depression of the numeral-keys after they have been partially depressed, and also to compel a full restoration of the numeral-keys on their return stroke. For this purpose, there are provided locking devices including the blade 146, Figures 4 and 10, secured to the shaft 147 pivotally supported in the end plates 70 and 71. The blade 146 is held in a central position by means of a spring 148 operative during the movement of the actuating cams 81 in either direction, with the longitudinal free edge 150 pointed to engage with the teeth 151 formed on a shoulder 152, Figures 7 and 24, of each actuating cam-device 81. Each actuating device 81, when operated, engages the locking blade 146 to rock it slightly downwardly against the tension of the spring 148, after which the teeth 151 brush over the pointed edge 150 of said locking blade, as indicated in Figure 14, thus preventing the return of any key until it and the connected actuating device 81 have been fully operated, as shown in Figure 16, where the actuating device has moved down sufficiently to clear the locking blade 146 and enable it to be returned to its central position by the spring 148. Upon the return stroke of the numeral-key, the locking blade 146 is moved slightly in the opposite direction by the returning actuating device 81, and the teeth 151 again become effective to engage the locking blade 146 as they sweep past said locking blade, as shown at Figure 17, to prevent a re-depression of the numeral-key prior to the complete restoration of the active actuator 81 to normal. The locking blade 146 may have cutouts or notches 153, Figure 4, to provide clearance for the extensions 114 of the actuating devices 81.

The back bar 67 of the actuator-frame is formed with a channel-shaped portion 154 extending rearwardly from the lower end of a vertical portion 155, to clear the shaft 82 and the actuating devices which extend forwardly from said shaft through the opening so formed.

Suspending from the vertical portion 155 of the bar 67 is a series of gravity pawls 156 suspended from screws or studs 157, said pawls being effective to prevent the operation of more than one actuating cam 81 at a time, and provided with sections 158 disposed to engage with each other, and with the extreme end pawls lying close to blocks 160 and 161, Figure 3, secured to the end plates 70 and 71, respectively. Said pawls occupy all the space between the blocks minus the thickness of one of the actuating devices 81, from which it follows that if one of the actuating devices is operated, it moves downwardly between two adjacent pawls, thus crowing the pawls sidewise, and causing the extreme end pawls to engage the blocks 160 and 161, and thus preventing another one of the actuating devices from entering between its associated locking pawls. The locking pawls are provided with holes 159 to make them as light as possible.

By an inspection of Figure 8, in which the parts are in their normal positions, it will be seen that pins 85 on arms 84 of the differential shaft 83 normally stand radially clear of the cam-slots 86, so that said shaft may be operated by any one of the actuating devices 81, and the other pins 85 will swing clear of their associated actuating devices. Each cam-slot 86 includes a dwell 163, within which the pin 85 engages and is locked against movement during the interval the rock-shaft 116 is being operated to connect the master-wheel and while the full-stroke devices are brought into use. After the locking blade 146 has become effective, the pin 85 rides upon a camming face 164 of the cam-slot 86 to actuate the shaft 83 through an angular distance depending upon the throw of the cam 164, the extent of the throw depending upon the contour of the camming face. After the pin 85 has passed the cam 164, it rides in a final dwell 163ª of the cam-slot 86, Figure 15, during which time the master-wheel 64 becomes disconnected through the blade 115 riding off the dwell 135, Figure 15, and the full-stroke device is rendered ineffective on the further downward depression of the key, to complete the stroke, as at Figure 16. To make the actuating devices as light as possible, they may be provided with holes 166, as indicated in Figure 8.

The totalizers may be like that disclosed in the patent to J. C. Wahl, No. 1,148,733, dated August 3, 1915, and each totalizer includes a lever 174, Figure 1, engaging with the teeth of a rack 175, to hold the totalizer adjusted to any letter-space position on a guide-plate 176 attached to the front face of a horizontal bar 177 of a totalizer-truck 178. The totalizer-truck also includes a channel-bar 180 at the lower front thereof, which is suspended from arms 181 secured to the ends of the bar 177, said channel-bar arranged to receive a roller 184 supported by a bracket 185 secured to the front bar 68 of the actuator-frame. The totalizer-truck has a to-and-fro movement with the typewriter-carriage, and is guided by a track or raceway 182 formed at the upper face of the actuator back bar 67, to co-operate with a companion raceway formed in the under face of the bar 177, to receive anti-friction rollers 183, arranged in pairs that are separated in the raceways by a roll-separating truck, well known in the typewriter art. To prevent displacement of the totalizer-truck from its raceways, there is provided a roller 186, Figure 1, at the rear of said truck to engage the upper rear face of the bar 177, the roller 186 being supported by a bracket 187 secured to the stationary back bar 67 of the actuator-frame. To assist in securing fine aligning and tooth-meshing relation between the master-wheel 64 and the computing wheels 66, as they successively engage the master-wheel, the roller 184 is located directly in front of the master-wheel, and the roller 186 may be located directly behind the master-wheel. A pointer 188 is provided to co-operate with scale-readings 190 on an inclined portion 191 of the totalizer, to indicate the denominational position of the totalizer.

To avoid the necessity for exact parallelism between the travel of the totalizer-truck and the travel of the power-driven typewriter-carriage, the driving connection between the carriage and the truck is such that the fixed path of the truck may vary slightly from the fixed path of the carriage without the carriage losing its timing control of the truck relative to letter-space positions. To this end, an arm 192 may be permanently secured to the typewriter carriage by screws 193, entering holes provided for the retaining screws for the line-space-lever-cover-plate, not shown, and formed with an ear 194 bent to hook under the rib of the front bar 195 of the typewriter-carriage, to assist in locating said arm to said carriage. The forward end of the arm 192 may be formed with a slot 196 (Figure 18) to embrace the shank or shoulder 197 of a screw 198 threaded into the bar 177, the shank of the screw being of sufficient length to allow a slight up-and-down play to the arm 192 under the head of the screw 198, and the slot further permits a slight forward and backward movement of the truck, to compensate for any slight variation in parallelism between the fixed paths of the typewriter-carriage and the totalizer-truck.

Each totalizer 65 includes a series of locking levers 200, (Figures 1 and 6) to prevent accidental rotation of the computing wheels 66, as indicated in the above-named Wahl patent. Said levers are pivoted on a rod 201 and have downwardly-extending fingers 202. Said levers are normally effective, but at each operation of a numeral-key, while the carriage is traversing the computing zone, the locking levers are operated, one at a time, successively, to release their associated computing wheels, so that the connected dial-wheel 203 may be rotated. To operate said locking levers 200, there is provided a lever 204, Figure 6, pivoted at 205 on the brace-plate 142, said lever 204 being normally held against a stop-pin 206 by a spring 207 connected to said lever. Said lever has at its lower end a cam-face 208, which is engaged by a roller 210 on an arm 211 secured to the rock-shaft 116, so that, when the shaft is operated through the extension 114 of the actuating devices 81, as previously described, the cam-end 208 of said lever 204 is vibrated to swing the upper end 212 thereof, to vibrate the finger 202 of the locking lever 200, which happens to be in its path, to swing said locking lever about its fulcrum-rod 201, as at Figure 12, and thus unlock the associated computing wheel 66 by raising the locking tooth 200$^a$ out of engagement with the teeth of its computing wheel 66. This unlocking of the computing wheel is done during the early part of the depression of the numeral-key, and the locking lever 200 is held in its released position through the medium of the lever 204 while the computing wheel 66 is being rotated by the master-wheel 64. It will be remembered that, during the latter part of the depression of the numeral-key and after the number has been run into the register, the rock-shaft is restored to its normal position, to disconnect the master-wheel from its driving mechanism, and again lock it against accidental rotation. Accordingly, upon the return of said shaft 116 at this time, Figure 16, the lever 204 will be restored by its spring 207, thus enabling the locking lever 200 to be again rendered effective by its connected spring 200$^b$.

Means has been provided to guard against premature letter-feeding movements of the carriage, so as to assure the complete actuation of the computing wheels, which includes a locking bar 213, Figures 6 and 18, supported at one end on the intermediate plate 142, and at its other end on a bracket 95. The locking bar 213 is provided with a slot 215, to receive any one of the fingers 202 of the locking levers 200 upon their actuation by the lever 204, and, since the lever 204 is held in its operated position while the number is being run into the register, the finger 202 is held within the slot 215, to lock the totalizer-carriage against a premature feeding movement.

The machine is normally set for addition, as indicated in Figure 3 where the rack 92 engages directly with the pinion 96, to drive the clutch-member 97, and subsequently the master-wheel 64 to actuate the computing wheels 66. In order to subtract, it is merely necessary to reverse the direction of rotation of the dial-wheels, by reversing the direction of rotation of the master-wheel. To bring about the reverse rotation of the master-wheel, or, in other words, to rotate it subtractively. a shift-pinion 216 is introduced between the driving rack 92 and the pinion 96 on the master-wheel shaft 101. This pinion is controlled by state-setting mechanism, which includes a lever 217, Figures 2 and 22, having two finger-pieces 218 and 219. When the machine is set for addition, the left-hand finger-piece 218 is depressed, and to set the machine for subtraction, the right-hand finger-piece 219 is depressed to the position in Figure 22, to rock a shaft 221 to which the lever 217 is connected. The shaft 221 is supported in a bracket 222 having ears 223 and 224, Figure 9, said bracket being secured to the intermediate plate 94. The shaft has connected thereto at its rear end, an upwardly-extending arm 225 having a roller 226 engaging within a groove 227 formed on the hub of the pinion 216. to slide said pinion rightwardly upon a shaft 228 and into engagement with the pinion 96, as at Figure 22, and during this sliding movement of the pinion 216, the driving rack 92 is moved leftwardly out of engagement with said pinion 96 and into engagement with the intermediate pinion 216. The driving rack 92 is slidably mounted upon the shaft 93, and to control the movement of said rack at either operative position, there is provided on the shaft 221 a downwardly-extending arm 230 having a pin 231 at its lower end engaging within an annular groove 232 of a hub 233 at the left-hand side of the driving rack 92, so that when the rock-shaft 221 is rocked to the position of Figure 22 by the depression of the subtraction-key 219, the driving rack is moved leftwardly thereby from the adding position in Figure 1 to the subtracting position in Figure 22. When the rack 92 is operated, it is effective to rotate the pinion 216, which, in turn, rotates the master pinion 96 and master-wheel 64. The actuating link 91, connected to the driving rack 92, is guided to slide freely, and without cramping on the stud-shaft 90. The link 91 is shifted laterally by an ear 234 bent at right angles to the face of the rack, said ear having a slot 235, through which the link passes to the stud-shaft 90. A lip 236, Figure 18, formed on a bracket 237 secured to the intermediate plate 94, normally lies between the teeth of the intermediate pinion 216, to hold it against accidental rotation, and to assure meshing alignment of its teeth with the teeth of the pinion 96 and the driving rack 92, and to assure engagement with said pinion and said rack when the machine is being set for subtraction. Said lip 236 is long enough to remain in engagement with the intermediate pinnon 216 until said pinion is in mesh with the pinion 96 and the driving rack 92, as shown in Figure 23, after which the pinion may be moved free of said lip 236 to the position in Figure 22. To set the machine for addition, it is merely necessary to depress the addition-key 218 of Figure 22, to shift the intermediate pinion 216 and the driving rack 92 back to the position indicated in Figure 3, and to hold the parts, when set for either addition or subtraction, there is provided a detent-spring 238, engaging the upper end of the arm 225, as shown in Figures 3 and 22.

It is desirable at times to disconnect the computing mechanism, or, in other words, set the machine so that the numeral-keys may be operated without operating the computing mechanism. For this purpose, there is provided a setting lever 240 movable between detent-stop positions, Figures 2, 20 and 21, having an "off" finger-piece 241 and an "on" finger-piece 242. Said setting lever is secured to the forward end of a rock-shaft 243 extending through the front bar 68 of the actuator-frame and having at its inner end a lever 244 formed with two fingers 245 and 246, which, when the machine is set for computing, occupy the positions in Figure 2, but when the "off" key 241 is depressed to disconnect the computing mechanism, the fingers 245 and 246 engage with pins 247 and 248, respectively, on the shafts 116 and 147, to rock said shafts to the positions indicated in Figures 20 and 21, thus rendering the plate 115 ineffective to be actuated by the extensions 114, or, in other words, enabling the camming devices 81, connected with the numeral-keys, to be operated independently of the shaft 116. Consequently, since the shaft 116 remains at rest, the master-wheel remains disconnected, and the camming devices actuate the differential shaft 83 idly. Since the full-stroke mechanism is only desirable when computing, it is rendered ineffective by the finger 246, which throws the blade 146 out of cooperative relation with the teeth 151 of the actuating devices, as indicated at Figure 21.

As shown at Figures 1, 25, 26 and 27, each numeral-key-lever 32 is formed with two key-stems 250 and 251, arranged in different planes, so that the stem 250 may receive a key-cap 34 at the usual position of the upper bank in the keyboard, and the stem 251 may receive the key-cap 252 at a position to form a fifth bank of keys between the lower bank of alphabet-keys 35 and the space bar 253. The upper bank of keys 34 has the usual double designations of both numeral and other characters, and may be employed when the lever 240 is set to the position of Figure 20, and aside from idly vibrating a few of the computing actuating elements, the touch of the keys 34, in typing, is nearly normal.

When the lever 240 is shifted to the "on" position of Figure 2, and a combined typing and computing operation is required, the lower bank of numeral-keys 252 is manipulated, and by thus increasing the ratio in leverage between the pivotal connection 80$^b$ and the position of the key-cap 34, the force of the finger-impact required at the keys 252 is greatly reduced, and the manipulation of these keys in jointly typing and computing numerals restores the manipulation of the keyboard to a more nearly uniform "touch" throughout the key-caps.

In Figure 25 a full keyboard layout is shown with the fifth bank of numeral-keys 252 disposed in operative relation with the alphabet-keys, space-bar, tabulator and other machine control keys. It will be noted that where the numeral-key-levers 32 interfere with the dip of adjacent alphabet-keys, said key-levers may be offset, as at 254.

In a computing mechanism of this character, the "0" key performs its function of typing a "0", but has no operative function to the computing mechanism, except to cause the totalizer to letter-space at each manipulation of the key. As the "0" key 252$^a$ is only employed during a joint typing and computing operation, if this key did nothing more than type a "0", the uniform "touch" at the lower bank of numeral-keys would be disturbed by the lighter "touch" of the key 252$^a$. To render the operative "touch" of the "0" key uniform with the other nine numeral-keys 252, said key 252$^a$ has a link 80$^a$, Figure 19, connected to a blind actuator 81$^b$, that is without any cam-slot 86, but is formed with full-stroke peripheral teeth and the side extension 114, to vibrate the shaft 116 to idly actuate the master-gear-releasing and gear-shifting elements. This idle operation of vibrating a train of computing parts increases the resistance of the "0" key to the finger-impact, to very nearly the same resistance of the other nine numeral-keys, and this resistance may be made uniformly the same by adjusting the key-lever-spring 32$^a$ for a heavier tension against the "0" key-lever 32.

From the foregoing description, it will be noted that this combined typewriting and computing mechanism is provided with two operation-controls at the front face of the actuator-frame, one control to predetermine the state of the actuating elements for either an additive or a subtractive state, and the other control to render the typewriting mechanism operative or inoperative to compute; that the state-control for addition has a direct transmission between the key-actuated rack and the driving pinion, to actuate the clutch-controlled master-gear; that the state-control for subtraction vibrates an intermediate pinion into mesh with the master-gear driving pinion and simultaneously vibrates the actuating rack from its operative mesh with said driving pinion into mesh with the intermediate pinion at a single manipulation of the control-lever; that the conditioning of the master-gear to be rotated by the rack-driven pinion jointly releases the master-gear from its locked condition, to be rotated differentially by the cam-actuated elements; that the state-control is so arranged that at all times the master-gear driving pinion is under the control of either the actuating rack or the intermediate driving pinion; and that the intermediate pinion, during its inactive state, is positively held in toothed side alignment with both the driving pinion and the actuating rack.

It will also be noted that the series of crank-arms 84 is arranged in a straight uniform plane upon the differential shaft 83, and that a differential key-actuated movement is conveyed to the shaft by increasing the radial sweep of the actuating cam-faces, rather than forming the cams uniformly the same and fanning the stud-bearing crank-arms around the shaft, as heretofore; that this arrangement not only reduces the cost of manufacture and assemblage, but the initial movement of the actuating cam-member 81 encloses the active pin 85 within the slot 86, and promotes a positive control of the pin and shaft 83 during the whole down and back sweep of the actuator, and positively prevents any overthrow of the crank-arm and its shaft that predetermines the degree of angular rotation for the master-gear; that the release of a computing wheel to be vibrated by the master-gear, and the locking of the totalizer at a letter-space position during the computing rotation are effected by a single locking element that performs the double function during the down-stroke of the numeral-key, and is carried by the totalizer in series with the computing wheels and actuated by means under control during the interval the master-gear is active; that the totalizer-truck is positively guided at the master-gear position, and becomes a trailer to the carriage through a single connection loosely secured to one end of the truck to permit the truck to adjust itself parallel to the path of the carriage; and that the full-stroke mechanism consists of a continuous peripheral toothed element for each actuator that co-operates with a spring-pressed two-way interlocking pawl that is common to the whole series of actuators, and which may be vibrated to an inoperative position as a unit by control means at the front face of the actuator-frame when the computing mechanism is to be rendered inoperative at the manipulation of the upper bank of keys 34 when typing is desired independently of the computing mechanism.

Variations may be resorted to within the scope of the invention, and portions of the improvements may be used without others.

Having thus described my invention, I claim:

1. In a typewriting machine having a traveling carriage, numeral-keys, a computing mechanism including a computing head adjustable on the carriage to predetermine a computing zone, and a stationary master gear operable to actuate the computing head within a computing zone, the combination of key-actuated mechanism including a cam-driven gear-sector always in train with a coupler operative to differentially determine the degree of rotation for the master gear, and a toothed clutch element slidably carried by the master gear and automatically shifted by the key-actuated mechanism to connect the master gear with the coupler to convey a digit value to the computing head.

2. In a typewriting machine having a traveling carriage, numeral-keys, a computing mechanism including a computing head movable with the carriage, and a master gear normally inoperative to actuate the computing head, the combination of a series of progressively stepped camming elements individually connected to the numeral-keys and movable thereby through arcs of the same extent, a rock-shaft, crank-arms mounted upon said rock-shaft in longitudinal alignment with each other and co-operative with the stepped camming elements to differentially rock said shaft, a rack operatively connected to be vibrated by the shaft, a pinion in train with the rack and disconnected from the master gear, and means actuated by the camming elements operable to connect the differentially rotatable pinion and the master gear.

3. In a typewriting machine having a traveling carriage, numeral-keys, a computing mechanism including a computing head movable with the carriage, and a locked-up master gear to actuate the computing head, the combination of a series of progressively stepped camming elements individually connected to the numeral-keys and movable thereby through arcs of the same extent, a rock-shaft, crank-arm mounted upon said rock-shaft in longitudinal alignment with each other and co-operative with the stepped camming elements to differentially rock said shaft, a rack positively connected to be vibrated by the shaft, a pinion disconnected from the master gear but in positive train with the rack, and mechanism actuated by the camming elements and operatively connected to simultaneously unlock the master gear and connect said gear with the rack-driven pinion.

4. In a combined typewriting and computing machine having numeral-keys and a master gear to be rotated by the keys through varying angular distances according to the value of the actuated numeral-key, the combination of means operably connecting each numeral-key with said master gear, including an actuating rack, a pinion in mesh with said rack, and a slidable clutch element carried by the master gear and normally disconnected from the pinion, and means operable by each numeral-key to operate the clutch element and connect the master gear with said rack-driven pinion.

5. In a combined typewriting and computing machine having numeral-keys and a master gear to be rotated through varying angular distances according to the value of the actuated numeral-key, the combination of means operably connecting each numeral-key with said master gear, said means including an actuating rack, a pinion in mesh with said rack, and a slidable clutch element carried by the master gear and normally disconnected from the pinion, means including a cam operable by each numeral-key to actuate said clutch element to connect the master gear with said pinion, and means including a dwell on the cam operable to hold the master gear and pinion in engagement, said means becoming operable at the end of the depression of the numeral-key to disconnect the master gear from the pinion to enable the actuating means and the numeral-key to return to normal position independently of the master gear.

6. In a combined typewriting and computing machine having numeral-keys and a master gear to be rotated through varying angular distances according to the value of the actuated numeral-key, the combination of rotatable means operably connecting each numeral-key with said master gear, said means including an actuating rack, a pinion in mesh with said rack, and a slidable clutch element carried by the master gear and normally disconnected from the pinion, and means operable by each numeral-key to actuate said clutch element to connect the master gear with said pinion, including a rock-shaft, a thrust link connected to said shaft, and a bell-crank operable by said link, said bell-crank engaging with said clutch element.

7. In a combined typewriting and computing machine having numeral-keys and a master gear, the combination of master-gear-driving devices differentially driven by said keys, including a pinion, a slidable clutch element between the master gear and said driven pinion, a rock-shaft operable by all the actuating devices, and a bell-crank operatively connected to said rock-shaft, said bell-crank being operable to vibrate said clutch element and connect and disconnect the master gear with the pinion during each downstroke of a key.

8. In a combined typewriting and computing machine having numeral-keys, a master gear and a shaft for said master gear, the combination of means operable by said keys and connected to drive said master gear, said means including a toothed wheel on said shaft, and a clutch element slidably carried by the master gear and supported on said shaft, and means actuable by said key-driven means to operate said clutch element to connect the master gear with said toothed wheel for a unitary rotation by the keys.

9. In a typewriting machine having a traveling carriage, numeral-keys, a computing mechanism including a computing head carried by the carriage, and a stationary master gear operable to actuate the computing head, the combination of key-actuated means including a series of progressively stepped camming elements, one element for each key and individually movable through arcs of uniform extent, a rock-shaft variably controlled by the camming elements, a gear-sector rockable by the shaft through a fixed plane to drive the master gear, and means carried by the master gear and shiftable by the keys to connect said master gear to the gear-sector.

10. In a typewriting machine having a traveling carriage, numeral-keys, a computing mechanism including a computing head carried by the carriage, and a stationary master gear operable to actuate the computing head, the combination of key-actuated means including a series of progressively stepped camming elements, one element for each key and individually movable through arcs of uniform extent, a rock-shaft differentially vibrated by the camming elements, a gear-sector actuated by said shaft in a fixed plane and operable to convey the differential movement to the master gear, and means initially actuated by the camming elements and operable to connect the master gear to the gear-sector before the sector is actuated by the camming elements.

11. In a typewriting machine having a traveling carriage, numeral-keys, a computing mechanism including a computing head adjustable on the carriage to predetermine a computing zone, and a stationary master-gear operable to actuate the computing head within a computing zone, the combination of a key-actuated mechanism including a gear-sector common to all the keys and always in train with a coupler driven thereby, a driven coupler normally inoperable by the first coupler and always in train with the master-gear, and means controllable by any numeral-key in its down stroke and effective first to bring the couplers into co-operation, then to drive the master-gear and convey a digit value to the computing head, and then to separate the two couplers so as to release the master-gear and permit the key-driven sector and its connected coupler to return idly to normal positions.

12. In a typewriting machine having a traveling carriage, numeral-keys, a computing mechanism including a totalizer, and a master-gear operable to actuate the totalizer within a computing zone, the combination of a key-actuated train of mechanism including a gear-sector common to all the keys, a pair of normally-open clutch-members, one member positively connected to be rotated in two directions by the gear-sector, and the other member positively connected to rotate always with the master-gear, and means operable by any depressed numeral-key and effective to bring one clutch-member into co-operation with the other clutch-member before computing motion is transmitted from any key to the master-gear.

13. In a typewriting machine having a traveling carriage, numeral-keys, a computing mechanism including a computing head movable with the carriage, and a master-gear normally inoperative to actuate the computing head, the combination of a series of progressively stepped cam-slotted elements individually connected to the numeral-keys and movable thereby through arcs of the same extent, a rock-shaft, crank-arms mounted upon said rock-shaft in longitudinal alignment with each other and co-operative with the stepped cam-slots to differentially rock said shaft, a rack vibrated by the shaft, means driven by the rack and connectible to drive the master-gear, and means actuated by the cam-slotted elements to connect and disconnect the master-gear with the rack-driven means during the depression of a numeral-key.

14. In a typewriting machine having numeral-keys, a computing head actuable for addition or subtraction, and a master-gear to actuate the computing head in either direction of its rotation, the combination of a key-actuated train of mechanism for rotating the master-gear in reverse directions, including a gear-sector, a master-pinion normally in train with the sector and connectible to rotate the master-gear for addition, an idle shift-pinion normally out of train with both the gear-sector and the master-pinion, and manual means operable to simultaneously slide the gear-sector out of train with the master-pinion and slide the idle shift-pinion into geared train with the gear-sector and with the master-pinion to reverse the direction of rotation of said master-pinion for a subtractive rotation of the master-gear.

15. In a typewriting machine having numeral-keys, a computing head actuable for addition or subtraction, and a master-gear to actuate the computing head in either direction of its rotation, the combination of a key-actuated train of mechanism for rotating the master-gear in reverse directions, including a gear-sector, a master-pinion normally in train with the sector and connectible to rotate the master-gear for addition, an idle shift-pinion normally out of train with both the gear-sector and the master-pinion, and manual means operable to simultaneously slide the gear-sector out of train with the master-pinion and slide the idle shift-pinion into geared train with the gear-sector and with the master-pinion to reverse the direction of rotation of said master-pinion for a subtractive rotation of the master-gear, said manual means including a shaft rockable by keys, said shaft having a pair of crank-arms, one arm connected to slide the master-pinion and the other arm connected to reversely slide the gear-sector.

16. In a combined typewriting and computing machine having numeral-keys, a master-gear having an open clutch and a gear-locking pawl, a master-pinion, and a train of key-actuated connections to rotate the master-pinion, the combination of means operable to release the master-gear and simultaneously connect the gear with the master-pinion, said means including a shaft rockable by the initial depression of each key, a lifter connected to the shaft, and a bell-crank and a crank-arm jointly vibrated by said lifter, the crank-arm effective to vibrate the master-gear-locking pawl to release the master-gear, and the bell-crank effective to close the master-gear-clutch with the master-pinion before the master-pinion is rotated by the key-actuated train.

17. In a typewriting machine having a traveling carriage, numeral-keys, a computing mechanism including a computing head movable with the carriage, and a master-gear to operate the computing head, the combination of a series of progressively stepped cam-slotted elements individually connected to the numeral-keys and all movable through arcs of the same extent, a rock-shaft, a series of crank-arms mounted upon the rock-shaft in longitudinal alignment with each other, each arm having a stud engageable with the stepped camming slots to differentially rock said shaft, a gear-sector movable in a fixed path and operable by connections with the rock-shaft to transmit a movement thereof to normally inoperative means rotated with the master-gear, and universal means operable by any cam-slotted element to connect said master-gear with the gear-sector before motion is conveyed to said sector by any key.

18. In a typewriting machine having a traveling carriage and numeral-keys, said carriage having guiding tracks, the combination with a computing mechanism including a key-operated train of totalizer-actuating mechanism, and an actuator-frame secured to the typewriter-frame and supporting said totalizer-actuating mechanism, of a rail upon said actuator-frame, a totalizer-truck guided by said rail in a true straight path independently of the typewriter-carriage, said truck-rail, actuating mechanism and actuator-frame forming a unit attached to the typewriting machine, and means loosely connecting said typewriter-carriage to said totalizer-truck to afford independent guiding action of each relatively to the other.

19. In a typewriting machine having a traveling carriage and numeral-keys, said carriage having guiding tracks, the combination with a computing mechanism including a key-operated train of totalizer-actuating mechanism, and an actuator-frame secured to the typewriter-frame and supporting said totalizer-actuating mechanism, of a rail upon said actuator-frame, a totalizer-truck guided by said rail in a true straight path independently of the typewriter-carriage, said truck-rail, actuating mechanism and actuator-frame forming a unit attached to the typewriting machine, and means loosely connecting said typewriter-carriage to said totalizer-truck to afford independent guiding action of each relatively to the other, said actuator-frame having a center roll and said totalizer-truck having a grooved track running upon said center roll to prevent vertical movement of the truck.

20. In a typewriting machine having a traveling carriage and numeral-keys, said carriage having guiding tracks, the combination with a computing mechanism including a key-operated train of totalizer-actuating mechanism, and an actuator-frame secured to the typewriter-frame and supporting said totalizer-actuating mechanism, of a rail upon said actuator-frame, a totalizer-truck guided by said rail in a true straight path independently of the typewriter-carriage, said truck-rail, actuating mechanism and actuator-frame forming a unit attached to the typewriter machine, means loosely connecting said typewriter-carriage to said totalizer-truck to afford independent guiding action of each relatively to the other, and a truck-holding center roll mounted upon the rear of said actuator-frame to overhang and bear upon the top face of the truck, to prevent dislodgement of the truck from said guide-rail upon said frame.

21. In a typewriting machine having a traveling carriage and numeral-keys, said carriage having guiding tracks, the combination with a computing mechanism including a key-operated train of totalizer-actuating mechanism, and an actuator-frame secured to the typewriter-frame and supporting said totalizer-actuating mechanism, of a rail upon said actuator-frame, a totalizer-truck guided by said rail in a true straight path independently of the typewriter-carriage, said truck-rail, actuating mechanism and actuator-frame forming a unit attached to the typewriting machine, means loosely connecting said typewriter-carriage to said totalizer-truck to afford independent guiding action of each relatively to the other, a truck-holding center roll secured to the rear of the actuator-frame to overhang and bear upon the top face of the truck to prevent dislodgment of the truck from the supporting rail, a front truck-aligning track in the form of a channel-bar co-extensive with the length of the truck, and a center roll fixed to the front of the actuator-frame and operative to engage the channel-bar and sustain the overhanging weight of the totalizers.

22. In a typewriting machine having a carriage traveling in a fixed path, numeral-keys, and a computing mechanism including a key-driven totalizer-actuating mechanism having a supporting frame secured to the typewriter-frame, the combination of means for moving a totalizer into co-operative relation with said actuating mechanism, said means including a truck wholly guided in a fixed path by a single continuous bearing rail on the actuator-frame, and an arm having a permanent connection with the carriage and a self-adjusting connection with one end of the truck, said arm being effective to hold the carriage and truck in letter-spacing alignments and compensate for variations in the fixed paths of the carriage and truck.

23. In a computing machine having a traveling totalizer and a relatively stationary master-gear for operating the totalizer, the combination of a train of mechanism operable by any numeral-key for rotating the master-gear in two directions, one direction for addition, and in the opposite direction for subtraction, said train of mechanism including an actuating gear-sector, a master-pinion connectible with the master-gear and a reversing shift-pinion, and manual means operable to jointly shift the gear-sector and the reversing pinion relatively to the master-pinion to determine the direction of rotation.

ALFRED G. F. KUROWSKI.